United States Patent [19]

McLaughlin et al.

[11] 4,096,914
[45] Jun. 27, 1978

[54] ACIDIZING ASPHALTENIC OIL RESERVOIRS WITH ACIDS CONTAINING SALICYLIC ACID

[75] Inventors: William A. McLaughlin, Bellaire; Edwin A. Richardson, Houston, both of Tex.

[73] Assignee: Shell Oil Company, Houston, Tex.

[21] Appl. No.: 748,087

[22] Filed: Dec. 6, 1976

[51] Int. Cl.$^2$ ............................................. E21B 43/16
[52] U.S. Cl. .................................. 166/307; 166/308; 252/8.55 B; 252/8.55 C
[58] Field of Search ............... 252/8.55 C, 8.55 B; 166/307, 304, 308

[56] References Cited

U.S. PATENT DOCUMENTS

| 2,175,095 | 10/1939 | Stoesser | 166/307 X |
| 2,301,875 | 11/1942 | Holmes | 252/8.55 C |
| 2,335,689 | 11/1943 | Morgan et al. | 252/8.55 C |
| 2,885,004 | 5/1959 | Perry | 252/8.55 C X |
| 3,142,335 | 7/1964 | Dill et al. | 252/8.55 C X |
| 3,625,284 | 12/1971 | Gogarty et al. | 166/307 X |
| 3,799,266 | 3/1974 | Kiel | 252/8.55 C X |
| 3,970,148 | 7/1976 | Jones et al. | 252/8.55 C X |

OTHER PUBLICATIONS

Organic Sequestering Agents, Chaberek et al., pp. 155, 405, 1959.

*Primary Examiner*—Benjamin R. Padgett
*Assistant Examiner*—E. Suzanne Parr

[57] ABSTRACT

A reservoir which contains an asphaltenic oil can be acidized with an aqueous acid without causing a deposition of permeability impairing iron-asphaltene compounds by dissolving or dispersing an effective amount of salicylic acid within at least the first injected portion of the aqueous acid.

10 Claims, No Drawings

ACIDIZING ASPHALTENIC OIL RESERVOIRS WITH ACIDS CONTAINING SALICYLIC ACID

BACKGROUND OF THE INVENTION

This invention relates to a well treating process in which an aqueous acid is flowed into successive contacts with iron and an asphaltene-containing oil. It is particularly pertinent to reservoir acidizing and/or fracturing processes in which an aqueous hydrochloric acid or lower fatty acid is stored in or pumped through iron containers and is injected into a subterranean reservoir that contains an oil of relatively high asphaltene content.

It is known that in reservoir stimulation processes in which an aqueous acid is injected into a subterranean earth formation at least the initial portion of the injected acid is apt to contain dissolved ferric iron. This commonly results from the dissolving of rust or scale or corrosion from iron or iron-containing containers for mixing or storing the acids or conduits for conveying the acids into the reservoir formation. For example, in cleaning a well which contains about 8,000 feet of typical 2⅜-inch steel tubing, ten barrels of 10% hydrochloric acid were circulated down a 1-inch string of tubing and back up the 1×2-inch annulus. The initial return of the circulated acid had a pH of 4.5 and a lowest pH of any portion of that acid was 3.2. The so-returned spent acid contained large amounts of precipitated solid comprising hydrated iron oxide. The amount of surface area of iron pipe was that contacted in that operation is about twice that of a typical injection down a 2-inch tubing string of the same length.

Numerous procedures have been previously proposed for avoiding the deleterious effects of dissolved iron in well treatments involving injections of aqueous acids. For example, in U.S. Pat. No. 2,175,081, which was applied for in 1937, it is suggested that since most of such deleterious effects are due to the precipitation of ferric ions, such effects can be avoided by incorporating a water soluble reducing agent within the injected acid. U.S. Pat. No. 2,175,095 suggests the inclusion within an acidizing fluid of a material such as lactic acid, ammonium acetate, glycine, glycolic acid, citric acid, or the like, which is capable of preventing the precipitation of iron or aluminum hydrates at their normal precipitation pH values. U.S. Pat. No. 2,335,689 suggests a similar inclusion of an iron sequestering agent, such as a polyhydric phenol within the injected acids. U.S. Pat. No. 3,142,335 suggests such a use of a sequestering agent containing a mixture of ingredients that function as a buffering agent, such as citric acid or citrate salt mixed with acetic or formic acids or their salts. U.S. Pat. No. 3,150,081 suggests a similar incorporation of mixtures of hydroxyacetic and citric acids, which mixtures are said to be cheaper and more effective than such a use of either of those acids by itself.

SUMMARY OF THE INVENTION

The present invention relates to a well-treating process in which an aqueous acid which is capable of dissolving solids in a manner increasing the permeability of a subterranean earth formation is brought into successive contacts with iron and an asphaltenic oil that is present within a subterranean reservoir. The process comprises including within at least the first injected portion of the acid a solution or homogeneous dispersion of at last enough salicylic acid to chelate with substantially all of the ferric ions that are dissolved within the acid.

DESCRIPTION OF THE INVENTION

The present invention is at least in part based on discoveries such as the following. In addition to being capable of forming permeability impairing hydrated iron oxides, any ferric ions which are contained in an oil reservoir acidizing fluid are also capable of forming permeability impairing iron-asphaltene compounds, particularly if the reservoir contains more than about ⅛% by weight of asphaltenic components. The solids formed by the interaction between ferric ions and asphaltenes comprise asphaltenic deposits that are particularly insoluble. Although none of the published prior art known to the applicants mentions the problems due to solids formed by the interaction of iron and asphaltenes, the difficulties of removing organic deposits containing asphaltenic compounds are mentioned. For example, the need for using solvents containing both an aromatic hydrocarbon and an amine in order to dissolve asphaltene-containing deposits are described in the application B-359,946, which was published Jan. 28, 1975. The forming and precipitating of iron-asphaltene compounds by the interaction of ferric ion-containing aqueous acid and a crude oil are not readily apparent, due to the relatively slow precipitate development and emulsification tendencies of such a system. However, based on numerous tests of numerous types of reducing agents and iron chelating materials, applicants have discovered that the incorporation of salicylic acid within a ferric ion-containing aqueous acid is uniquely effective in preventing the formation of permeability impairing iron-asphaltene solids.

In general, the aqueous acid used in the present invention can be substantially any which is capable of dissolving solid materials located within a permeable subterranean earth formation in a manner increasing the permeability of that formation. As known to those skilled in the art, such acids generally comprise solutions and/or homogeneous dispersions of aqueous hydrochloric, formic and/or acetic acids. Such acids may contain dissolved or substantially homogeneously dispersed additives such as water-thickening agents, wetting agents, corrosion inhibitors, or the like. Such acids may also contain hydrofluoric acid, or materials which form hydrofluoric acid, to provide a so-called mud acid capable of dissolving clay or silica.

In the prsent process, the aqueous acid with which the salicylic acid is mixed may be injected before, during or after the injection of other formation-treating materials, i.e., such acids may be emulsified with or injected ahead or behind a liquid oil solvent such as a liquid hydrocarbon. Such an oil solvent is preferably a solvent for asphaltenic oils, such as an aromatic liquid hydrocarbon having a composition and/or asphaltenic oil solubility at least substantially equivalent to those of toluene or an oil solvent solution consisting essentially of toluene. The salicylic acid containing acid may also be injected along with or ahead of or behind a relatively viscous aqueous solution of the water-thickening agent, i.e., a polysaccharide material, such as Kelzan available from Kelco Company; Polytran available from Pillsburgy Co.; or a partially hydrolized polyacrylamide, such as Pusher, available from Dow Chemical Co., or the like.

Table I shows the results of simple glass bottle tests of the precipitation obtained from mixing a Ventura crude oil having an asphaltenic content of about 15% by weight with a 0.1M HCL solution, with and without dissolved ferric ion. Two commercially available antisludging agents, Dowell W-35 and W-50, were found to have very little effect with respect to the precipitated asphalt sludge formed by the interaction of the ferric ions and asphaltenic materials. Tests 4 and 5 indicate that a 4-hour heating time was not sufficient to develop the full amount of precipitate that would be formed by the interaction between the acid and the crude oil, even where the acid was free of dissolved ferric ions — since the amount of precipitant developed in 96 hours was 62 mg, whereas that developed in 4 hours was only 2.4 mg.

TABLE I

| Test No. | Fe Added To Acid mg | Valence | Static Heat Hr. At 70° C | Anti Sludge Additive 0.25 cc | Precipitated Asphalt Sludge mg |
|---|---|---|---|---|---|
| 1 | 51 | +3 | 4 | None | 15.5 |
| 2 | 51 | +3 | 4 | Dowell-W 35 | 12.3 |
| 3 | 51 | +3 | 4 | Dowell-W 50 | 12.5 |
| 4 | 0 | — | 96 | None | 62 |
| 5 | 0 | — | 4 | None | 2.4 |

Table II shows the results of similar tests in which aqueous hydrochloric acids of the specified concentrations and ferric ion contents were mixed with a synthetic crude oil and, except as otherwise indicated, were aged for 20 hours at 70° C. The synthetic crude oil was a solution of the Ventura crude oil in toluene in concentrations providing indicated proportions of total asphalt. Note that in Test 5, in which no ferric ion was added, the amount of sludge precipitated was only 2M whereas in Test 4, in which 300 M of ferric ion was added, the precipitate was 39M. A comparision, between Tests 1-5, with 0.1M hydrochloric acid, and Tests 6-10, with 2M hydrochloric acid, indicates the effect of higher acid concentrations on enhancing the deposition of an asphalt sludge material with and without the presence of ferric ions. Tests 11-16 are indicative of the non-precipitate forming characteristics of ferrous ions. The precipitates that were observed were probably due to contamination by ferric ions formed by air oxidation. In view of the analogous results of Test 17-20, it is apparent that the formation of the complexes or other solids by the interaction of iron and asphaltenes is or is substantially dependent on the presence of ferric ions.

TABLE II

| Test No. | Total Ashpalt In Test (40 ml Synthetic Crude) Grams | HCL Volume ml | HCL Conc. M/l | Fe Added To Acid mg | Fe Added To Acid Volume | Precipitated Asphalt Sludge mg |
|---|---|---|---|---|---|---|
| 1 | 0.5 | 40 | 0.1 | 50 | +3 | 12 |
| 2 | 0.5 | 40 | 0.1 | 100 | +3 | 12 |
| 3 | 0.5 | 40 | 0.1 | 200 | +3 | 11 |
| 4 | 0.5 | 40 | 0.1 | 300 | +3 | 39 |
| 5 | 0.5 | 40 | 0.1 | 0 | +3 | 2 |
| 6 | 0.5 | 14.7 | 2.0 | 50 | +3 | 118 |
| 7 | 0.5 | 29.4 | 2.0 | 100 | +3 | 118 |
| 8 | 0.5 | 58.8 | 2.0 | 200 | +3 | 119 |
| 9 | 0.5 | 88.2 | 2.0 | 300 | +3 | 144 |
| 10 | 0.5 | 88.2 | 0 | 0 | +3 | 10 |
| 11 | 0.5 | 88.2 | 2.0 | 100 | +2 | 6* |
| 12 | 0.5 | 88.2 | 2.0 | 300 | +2 | 7* |
| 13 | 0.5 | 88.2 | 2.0 | 100 | +2 | 19 |
| 14 | 0.5 | 88.2 | 2.0 | 300 | +2 | 15 |
| 15 | 0.5 | 88.2 | 0.1 | 100 | +2 | 5 |
| 16 | 0.5 | 88.2 | 0.1 | 300 | +2 | 4 |
| 17 | 0.1 | 88.2 | 2.0 | 300 | +3 | 46 |
| 18 | 0.2 | 88.2 | 2.0 | 300 | +3 | 99 |
| 19 | 0.1 | 88.2 | 2.0 | 300 | +2 | 5 |
| 20 | 0.2 | 88.2 | 2.0 | 300 | +2 | 19 |

*Four Hour Aging Time.

Table III shows the results of tests of various additives for preventing such an acid-induced generation of asphaltenic solids. Except where indicated otherwise, the systems tested comprised 40 ml portions of toluene mixed with 0.5 grams of Ventura asphalt, 88.2 ml of 2 M hydrochloric acid, and 300 mg of ferric or ferrous ions. The systems were, usually, aged for 20 hours at 70° C. The data in Table III indicates that, although urea is somewhat effective, because it reduces the ferric ions to ferrous ions, the rate of that reaction is undesirably slow. And, similarly, although stannus chloride is somewhat effective, it is difficult to keep it from forming oxides whenever it is exposed to air.

The data in Table III further indicate that, with respect to preventing the formation of iron-asphaltene materials by chelating the ferric ions, salicylic acid was effective. Since previously used chelating agents such as citric acid or oxalic acid were comparatively ineffective, that effectiveness of salicylic acid was not obvious.

TABLE III

| Test No. | Fe Added To Acid Valence State | Additive to Acid | Precipitated Asphalt Sludge mg | Notes |
|---|---|---|---|---|
| 1 | | 10.6 grams of Urea | 1.5 | |
| 2 | +2 | 10.6 grams of Urea + 1.3 grams ofCitric Acid | 2 | |
| 3 | +2 | 1.3 grams of Citric Acid | 13 | |
| 4 | +3 | 1.3 grams of Citric Acid | 225 | |
| 5 | +3 | 6.3 grams of Vensene 100 | 165 | |
| 6 | +3 | 10.6 grams of Urea | 83 | |
| 7 | +3 | .18 grams of Urea | 25*[4] | |
| 8 | +3 | .005 Moles SnCl$_2$ + 2 gm Sn ° pellets | 0*[1] | Formed white ppt. |
| 9 | +3 | .005 Moles NH$_2$OH HCl | large Amt*[1] | |
| 10 | +3 | .0045 MOles SnCl$_2$ | Large Amt | SnCl$_2$ dissolved in 4M HCL |
| 11 | +2 | .001 Moles SnCl$_2$ | Small Amt | |
| 12 | +3 | .004 Moles SnCl$_2$ | Small Amt | |
| 13*[2] | +3 | .0054 Moles SnCl$_2$ | 54 | |
| 14 | +2 | .001 Moles SnCl$_2$ | Small Amt | |
| 15*[3] | +2 | .0054 Moles SnCl$_2$ | 40 | |
| 16*[4] | +3 | .005 Moles NaH$_2$PO$_2$*[5] | 18 | |
| 17*[4] | +3 | .01 Moles NaH$_2$PO$_2$ +.09 Moles Acetamide | 11 | |
| 18*[4] | +3 | .01 Moles NaH$_2$PO$_2$ | — | Gave a pink flock pre-aging |
| 19*[6] | +3 | 0.18 Moles Acetamide | Large Amt | |
| 20*[6] | +3 | 0.18 Moles Dimethylformamide | Large Amt | |
| 21*[6] | +3 | 0.11 Moles Dimethylformamide | Large Amt | |
| 22*[6] | +3 | None | 250 | |
| 23*[7] | +3 | 2 grams Salicylic Acid + 5 cc n-Butanol (20 hr at 70° C pre aging before adding synthetic | 0.1 | |

TABLE III-continued

| Test No. | Fe Added To Acid Valence State | Additive to Acid | Precipitated Asphalt Sludge mg | Notes |
|---|---|---|---|---|
| | | crude) | | |
| 24 | +3 | 0.01 Moles oxalic acid | Large amount | |

*[1] Aging = 16 hrs at 70° C
*[2] test 12 reheated after addition of .0054 moles more SnCl$_2$
*[3] Test 14 reheated after addition of .0054 moles ore SnCl$_2$
*[4] Aged aqueous solution 20 hrs at 70° C before using in the test
*[5] 0.01 moles gives a ppt on standing in 0.1M HCl before use in the test
*[6] Six-day aging at 70° C
*[7] IPA and methanol are not suitable as a solubilizer for Salacylic acid In general, in a well treatment process most, if not all, of the ferric ion that becomes dissolved in an aqueous acid that is injected into a reservoir formation will be derived from contaminants in the acid as delivered at the well site, or will be dissolved from rust and/or scale in the containers or conduits utilized in flowing the acid into the reservoir. Therefore, if the acid, as delivered at the well site, is substantially free of ferric ions, most, if not all, of the salicylic acid which is used in the present process need only be incorporated within an initial volume of the acid. Such an initial volume should be large enough to remove substantially all of the rust from the iron containers through which the acid is flowed. Although the succeeding portions of acids will dissolve iron from the rust-free conduits, substantially all of that iron will be in the ferrous state.

In a particularly suitable procedure for conducting the present process, a volume of liquid solvent for asphaltenic oil (e.g., toluene) sufficient to dissolve most of the oil within the first few feet around the well is injected along with the salicylic acid-containing acidizing acid in the form of an oil-in-water emulsion. Alternatively, such a volume of such a solvent can be injected in the form of a slug preceding the injection of the acid.

Where the reservoir being treated by the present process is relatively unconsolidated, the procedure for injecting an oil solvent and the acidizing acid and returning the well to injection or production, can advantageously be that described in the J. H. Lybarger U.S. Pat. No. 3,948,324. Where the reservoir is siliceous and its permeability may be impaired by clay or silica fines, at least a portion of the acidizing acid should be a mud acid, and the materials injected should include pretreatment slugs of hydrochloric acid and ammonium chloride to enhance the clay-dissolving action of the mud acid. Where the reservoir is relatively free of clay or siliceous permeability impairing materials, the acidizing acid can be free of hydrogen fluoride (which will eliminate the need for such HCl and NH$_4$Cl pretreatments) but the relatively slow injection of fluids and slow return to the injection or production rate best suited for the particular well can advantageously be those described in that patent.

In including the salicylic acid in a formation treating aqueous acid in accordance with the present process, various forms of starting materials and various procedures can be used to form a suitable solution and/or homogeneous dispersion. Salicylic acid and/or at least one alkali metal or ammonium salicylate in the form of a solid or solution (preferably aqueous) can be simply mingled with the formation treating acid and agitated to an extent sufficient to provide a solution and/or homogeneous dispersion. Alternatively, such a form of the acid or salt can be premixed with the formation treating acid along with a solubilizing agent, e.g., a completely water miscible monohydric or polyhydric alcohol. Alternatively, such an acid or salt can be mixed with the formation treating acid along with an oil solvent liquid and agitated to provide an oil and water emulsion or dispersion. Alternatively, such a solution or dispersion of salicylic acid or such salicylate salts can be injected into the reservoir immediately ahead of the formation treating acid (which may or may not be mixed with solubilizing agents or oil solvents) so that the formation treating acid is mixed with the salicylic acid within the reservoir formation. Particularly advantageous procedures comprise (a) premixing the reservoir formation treating acid (and/or a mixture of it and an oil solvent) with an aqueous solution of ammonium salyciclate or (b) where the well or subterranean earth formation to be treated may contain aqueous solutions of ferric iron within the zone to be treated, injecting a slug of an aqueous solution of ammonium salicylate before injecting the salicylic acid containing portion of the formation treating acid.

In general, the concentration of salicylic acid within the first injected portion of the formation treating acid should be from about 0.2 to 1.0 moles per liter. The concentration of salicylate ions in an aqueous salicylate containing pretreatment solution should be from about 0.01 to 1.0 moles per liter. Where the aqueous formation treating acid is being mixed with a solution of salicylic acid (or at least one of its salts) the salicylate-containing solution is preferably relatively concentrated, e.g., a substantially saturated solution of the acid in a hot aqueous solution or a substantially saturated aqueous solution of a salt of the acid.

What is claimed is:

1. In a well treating process in which an aqueous hydrochloric acid-containing acid capable of dissolving solids in a manner increasing the permeability of a subterranean earth formation is brought into successive contacts with iron and an asphaltene-containing oil that is present within a subterreanean reservoir in a manner that may form permeability impairing iron-asphaltene solids, the improvement which comprises, including within at least the first portion of the aqueous hydrochloric acid-containing acid, a solution or homogeneous dispersion of at least enough salicylic acid to chelate with and prevent the formation of iron-asphaltene solids by substantially all of the ferric ions that become dissolved within the acid that enters the earth formation.

2. The process of claim 1 in which the salicylic acid-containing portion of the aqueous acid is mixed with a liquid solvent for an asphaltenic oil.

3. The process of claim 2 in which the oil solvent comprises an aromatic liquid hydrocarbon which is dispersed within the aqueous acid and an oil phase of an oil-in-water emulsion.

4. The process of claim 1 in which the salicylic acid-containing aqueous acid is flowed into the subterranean earth formation during the course of a fracture-acidizing treatment of the well.

5. The process of claim 1 in which the flowing of the salicylic acid-containing aqueous acid into the subterranean earth formation is preceded by flowing a slug of liquid solvent for an asphaltenic oil into that formation.

6. The process of claim 1 in which the aqueous acid contains both hydrochloric and hydrofluoric acid and is a mud acid and the flowing of the salicylic acid-containing portion of the mud acid into the reservoir is preceded by the flowing into the reservoir of a salicylic acid-containing portion of aqueous hydrochloric acid.

7. The process of claim 1 in which the salicylic acid is included in the first injected portion of the aqueous acid by mixing it with that portion in the form of a substantially dry solid or relatively concentrated aqueous solution of ammonium salicylate.

8. The process of claim 7 in which the ammonium salicylate is mixed with the aqueous acid along with a liquid oil solvent and the mixture is agitated to form a relatively homogeneous oil-in-water dispersion of oil solvent within the aqueous acid.

9. The process of claim 1 in which the injecting of the salicylic acid-containing portion of aqueous acid is preceded by injecting a slug of an aqueous solution of ammonium salicylate.

10. The process of claim 9 in which the injection of the ammonium salicylate solution is preceded by injecting a slug of liquid oil solvent.

* * * * *